United States Patent [19]

Van Der Dungen

[11] Patent Number: 5,104,349
[45] Date of Patent: Apr. 14, 1992

[54] APPARATUS FOR SEPARATING STRAIGHT SAUSAGES FROM A STRING WITH REMOVAL MEANS FOR THE SAUSAGE

[75] Inventor: Wilhelmus J. E. Van Der Dungen, Veghel, Netherlands

[73] Assignee: Stork Protecon B.V., Ag Oss, Netherlands

[21] Appl. No.: 613,805

[22] PCT Filed: Apr. 20, 1990

[86] PCT No.: PCT/NL90/00052

§ 371 Date: Feb. 11, 1991

§ 102(e) Date: Feb. 11, 1991

[87] PCT Pub. No.: WO89/09781

PCT Pub. Date: Oct. 19, 1989

[30] Foreign Application Priority Data

Apr. 24, 1989 [NL] Netherlands .................. 8901026

[51] Int. Cl.⁵ .................................................. A22C 11/00
[52] U.S. Cl. ............................................................ 452/51
[58] Field of Search .............................. 452/51, 48, 46

[56] References Cited

U.S. PATENT DOCUMENTS

| | | | |
|---|---|---|---|
| 1,545,586 | 7/1925 | Kruse | 452/51 |
| 2,651,808 | 9/1953 | Burnett et al. | 452/51 |
| 3,296,657 | 1/1967 | Moekle | 452/51 |
| 3,971,101 | 7/1976 | Townsend et al. | 452/51 |
| 4,129,923 | 12/1978 | Hoegger | 452/46 |
| 4,671,042 | 6/1987 | Moekle | 53/122 |

FOREIGN PATENT DOCUMENTS

| | | |
|---|---|---|
| 66142 | 8/1982 | European Pat. Off. . |
| 121106 | 10/1984 | European Pat. Off. . |
| 237298 | 3/1987 | European Pat. Off. . |
| 86968 | 12/1957 | Netherlands . |
| 6912110 | 2/1971 | Netherlands . |
| 745780 | 3/1956 | United Kingdom . |
| 2147189 | 5/1985 | United Kingdom . |

*Primary Examiner*—Willis Little
*Attorney, Agent, or Firm*—Harness, Dickey & Pierce

[57] ABSTRACT

Apparatus for the separation of sausages from a string by a scissor structure moving with the string, of which structure the scissors (5, 6) constrict and separate the string. In the zone of separation of the sausages these are present on a stationary inclined guide surface (10), leading to a moving conveying surface (12). Above the guide surface (10) and to the sides of the sausages blowing means (15) are provided, blowing air from the side onto the sausages, so that they are displaced sideways on the guide surface (10) directly at separation from the string. Thus the sausages form rows one to the side of the other on the conveying surface (12), in which either exclusively blowing takes place, alternatingly to one and the other side, or there is no blowing for each third sausage from the string, so that either two or three rows can be formed.

10 Claims, 1 Drawing Sheet

APPARATUS FOR SEPARATING STRAIGHT SAUSAGES FROM A STRING WITH REMOVAL MEANS FOR THE SAUSAGE

The invention relates to an apparatus for separating straight sausages from a string by means of a moving endless scissor structure of which the separate scissors convey the string along, constrict it and separate it, having removal means underneath with a moving conveying surface which collects and removes the sausages.

It is known in practice to separate sausages, especially shorter sausages, from a string of sausages by constricting the string at the correct mutual distances with scissors and then cutting it through. The scissors are situated on an endless moving system, for example a socalled crimping wheel having a horizontal axis and the sausages are separated in a lowermost zone of said wheel. In this process, a collecting dish is able in each case to receive a falling separated sausage, which dish then opens in order to drop the sausage onto the moving conveying surface, normally a conveyor belt.

Said conveyor belt runs somewhat more rapidly than the scissors (the circumferential speed of the crimping wheel) in order to obtain some distance between successive sausages. Situated above the conveyor belt are raised edges or walls, which may or may not move concomitantly and which may or may not be flexible, between which a small trough is formed in order to keep the falling sausage in the correct position on the conveyor belt.

Somewhat further downstream on said belt, the sausages are transferred to another conveyor belt, in which process a sensor detects the passage of a sausage on the first conveyor belt and actuates lateral displacement means such as blowing means in order to displace sausages laterally in a regular pattern so that they move further on said other conveyor belt in two or three rows, small troughs on said conveyor belt again being able to receive the sausages indisplaceably.

Passing sausages can be detected with light and a photo cell.

This known system has all kinds of disadvantages. As a result of its higher speed, the conveyor belt has created distances between the sausages, which are not exactly equal.

This imposes high requirements on the detection apparatus and the coupling thereof to the lateral displacement means.

The following problems furthermore occur. Modern sausages are often formed by extruding a layer of collagen material around a meat string, in which process the collagen material sets (solidifies) relatively slowly and forms a casing for the meat material to replace the previously standard sausage skins composed of natural or artificial guts. The still not completely set collagen material is capable, during smooth constriction by the scissors, of being joined to itself and to the meat material in such a manner that, during the subsequent cutting through by the scissors, the sausages are well sealed and do not have to be tied up separately.

In the stage of separation from the string, however, such sausages are very vulnerable before the casing has set sufficiently downstream of the apparatus for forming, separating and removal. The blowing means for distributing in rows must therefore not blow too strongly against them, just as mechanical means for distributing in rows must not exert high forces on the sausages. In the known lateral displacement means described, however, it is difficult to keep the lateral forces on the sausages sufficiently low, while the sausages are already unfavourably loaded in the collecting dishes and while falling on to the somewhat faster conveyor belt.

Such an apparatus is furthermore complicated and not very compact.

The object of the invention is therefore to avoid the abovementioned disadvantages and to provide a removal apparatus for sausages which meets all the requirements of reliable operation, simplicity of construction and compactness. In this connection it is pointed out that the invention is suitable in particular, but not exclusively, for use in making short sausages such as small sausages 2 to 4 cm long such as are more and more in use and for use in the case of small sausages with a collagen layer as the casing of the meat content.

For this purpose, according to the invention, an apparatus as referred to in the preamble is characterized in that a stationary sloping guide surface is provided which receives the sausages at the position of separation from the string by the scissor structure and conveys them to the moving conveying surface underneath, and in that, downstream of the position of separation of the sausages from the string by the scissor structure, blowing means are provided to the side of the track of the sausages on the guide surface and above the latter in order to blow against the sausages on the guide surface approximately horizontally from the side so that, at the end of the guide surface and on the moving conveying surface, they move further in two or three rows, and in that the scissor structure pushes the sausages on the guide surface by its movement.

The scissor structure now pushes the sausages on the guide surface, which can easily be constructed very smoothly, in front of the blowing means, it is sufficient to blow only lightly against the sausages in order to get them in the desired row, already close to the position where the sausages are separated from the string two or three rows of sausages are formed and the moving conveying surface does not need to accelerate the sausages sliding off the guide surface. The removal and distribution means can be simpler and much shorter than in the known embodiment and the sausage detection can be derived in a simple manner, for example from the movement of the scissor structure.

Preferably, such an apparatus according to the invention is characterized in that the means for actuating the scissor structure are so constructed and the stationary guide surface and the blowing means are so arranged that the scissor structure separates the sausages from the oncoming string after it has placed the sausages with at least a part of their length on the stationary guide surface in front of the blowing means.

This achieves the result that the position of each sausage during blowing is more clearly defined and that no disadvantage is experienced from local differences in friction between sausages and guide surface, over which they can slide downwards fairly quickly, which are able to cause dynamic curvatures of the sausages to occur, so that also as a result of this it is only necessary to blow gently for a good distribution in rows.

It is pointed out that not only in the known structures described above but also in other known structures, products can be distributed from a single oncoming stream into separate rows by blowing against them with jets of air. Thus it is known to place cylindrical products moving in the direction of their axis towards a distribution station, under the compulsion of lateral entrapment, on a central longitudinal ridge where they are in unstable equilibrium but remain laterally entrapped until they reach the distribution means which cause the products, mechanically or with gas or liquid jets, to tip to one side or the other of the ridge (Dutch Patent Application 6912110). For flat products it is known to place them on a stationary guide surface with a central ridge and then to blow from above at the one side or the other of the ridge on to the products in order to cause them to reliably tip to one side or the other (EP-A-066,142).

For vulnerable sausages such distribution apparatuses are partly unsuitable due to damage to the sausages and partly unusable because the apparatus would cause the sausages to roll arbitrarily to one side or the other of the central ridge before the blowing means could control this or would even fail to place most of the sausages on the central ridge. Known mechanical distribution apparatuses with swivelling deflection members above stationary or moving guide surfaces or with deflection devices rotated alternatingly in the one direction or the other around their axis parallel to the direction of movement of the products are still much less suitable for sausages.

The invention will now be explained in more detail with reference to the accompanying drawings. In these:

Figure 1:
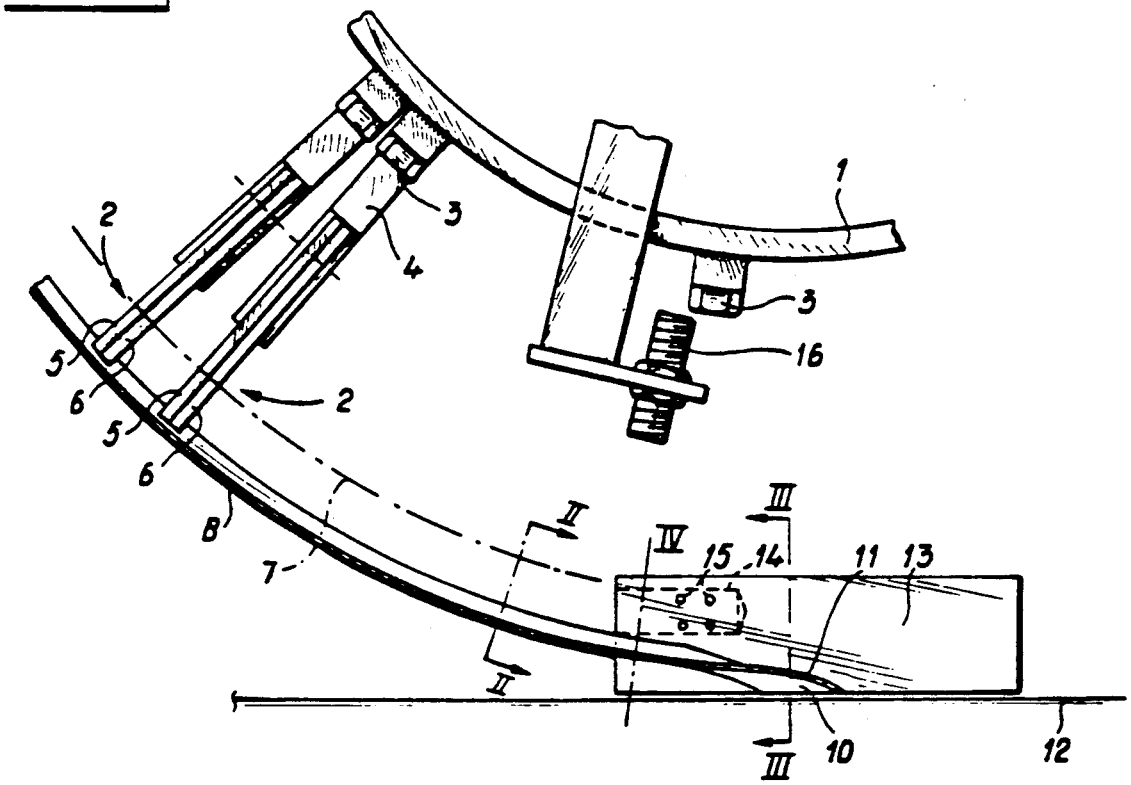
FIG. 1 is a partial side elevation, partial section in a vertical plane through the axial longitudinal center of a crimping wheel with a removing apparatus according to the invention.

In FIG. 1, 1 indicates a drum which carries on its outside circumference a plurality of scissor structures 2 of which only two have been drawn. These may be secured with bolts 3 on the drum, can be of any desired and known structure and have an actuating mechanism 4 in which, for example, rods with guide rollers can be displaced perpendicularly to the plane of the drawing, which displacement can be brought about by fixed guide tracks. Said actuating mechanism and said guide tracks lie largely at a distance axially outside the region in which the scissors act on the sausages. If desired, the scissor structures can be secured at various distances along the circumference of the drum 1 in a manner such that one and the same machine can be adjusted to different sausage lengths. The scissor structures 2 have, in a known manner, two scissor legs 5 and 6 which can be moved towards each other which can constrict a sausage string in a flowing manner in order to cut the latter through only thereafter during the further movement towards each other.

From a sausage extruding or filling machine, which is not shown, a sausage string emerges which is subsequently conveyed through a brine bath and then fed (from the top right in FIG. 1) to the circumference of the drum 1 which rotates anti-clockwise around a horizontal axis as seen in FIG. 1. When the string is received on the drum, it is received between the scissor legs 5 and 6 which are wide open for the purpose. As the drum turns further with the concomitantly moving string, the string is partially constricted by the scissor legs of each scissor moving towards each other and finally cut through thereby, with the result that separate sausages are formed. The modern casings of the meat material are of such a type that, at the end of the constriction, they adhere adequately together in order to enclose the meat material in the sausage.

Figure 2:
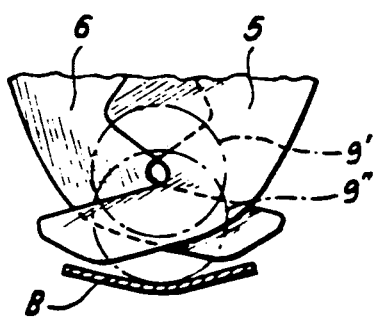
FIG. 2 is a partial section along the line II—II in FIG. 1.

In FIG. 1, chain-dot line 7 shows the centre line of the track of the sausage string around the drum 1 in the final part of the constriction path. Here the scissors are closed to such an extent that they prevent the sausage string moving downwards out of the drum. In this part of the track a fixed guide trough 8 is concentrically provided around the drum 1. FIG. 2 shows the section thereof with adjacent parts of the scissor legs 5 and 6 near the end of the constriction and before cutting through, which stage of FIG. 2 is reached at the position of the sectioning line II—II in FIG. 1.

The scissor legs 5 and 6 now move further towards and along each other in order to cut the string through, as a result of which a sausage is separated whose front end thus falls first at the bottom end of the trough 8 and, after being cut through by the next scissors, its rear end then also falls into it. In FIG. 2 it can be seen that the sausage 9 is situated in position 9' before cutting through and immediately after cutting through, which does not yet occur in section II—II, in position 9''. The sausage 9 therefore hardly falls and will also move in a flowing manner to the extent that first the front end falls over the short vertical distance between 9' and 9'' and, of course, the rear end only somewhat later. At the position of the line IV—IV in FIG. 1, the cutting-through is complete.

The trough 8 is smoothly adjoined at the bottom by a stationary flat guide plate 10 which smoothly slopes towards an endless conveyor belt 12 which runs directly beneath the guide plate 10 and which is driven at the same speed as the circumferential speed of the radial outside circumference of the sausage string and of the scissor legs 5 and 6. As soon as a sausage has been separated completely from the string at the position of the line IV—IV, it will slide under its own weight over the sloping guide plate 10 to the conveyor belt 12, but in as far as this does not take place quickly enough, the scissor legs 5 and 6 push the sausages further over the guide plate until they are pushed therefrom on to the conveyor belt 12. The guide plate 10 (FIG. 3) has a central raised ridge 11 which smoothly projects upwards therefrom with the first part of its tip virtually horizontal and then sloping more strongly to a point downstream of the position where the plate 10 terminates on either side thereof, as can be clearly seen in FIG. 1.

The conveyor belt 12 is appreciably wider than the guide plate 10 and situated along and above said plate are two fixed guide bodies 13 which have holes 14 at the front end (on the left in FIG. 1) adjoining four openings 15 at the position of the first part of the guide plate 10. The holes 14 are connected to a source of pressurized air via a fast-acting control valve system (not shown) actuated by a detection apparatus for detecting the position of the separated sausages. Here said detection apparatus is constructed as a sensor 16 mounted on the support of the drum 1 so as not to rotate concomitantly and in an adjustable manner. This reacts, for example via magnetic induction, to the passage of a fixing bolt 3 with which the scissor structures 2 are secured on the drum so that it is situated at an axial distance outside the sausage track and is therefore not readily contaminated.

A signal could alternatively be derived from the angular position of the drum 1, for example directly from a part on the axis thereof, but this requires somewhat more adjustment if the scissors can be placed at different positions, and therefore at varying distances on the drum.

If the sensor 16 observes the passage of a bolt 3 (i.e. somewhat earlier than indicated in FIG. 1) the control valve system is actuated in accordance with a certain pattern, in this case so that a surge of pressurized air is conveyed to one of the holes 14 for every two passing sausages when a sausage is situated before the openings 15 thereof so that this sausage is blown to one side of the guide plate 10, that is to say over one side of the ridge 11, and the sausage subsequent thereto is blown by a surge of air from the openings 15 from the opposite hole to the other side of the ridge 11 on the guide plate 10.

The sausages thus arrive in two rows next to each other on the conveyor belt, with distances of one sausage length between consecutive sausages in the same row.

The conveyor belt 12 may have suitable elevations, ribs or small troughs, which are not shown, in order to hold the sausages placed thereon better in their position thereon.

At some distance from the apparatus described, the sausages may, if desired, be distributed over more rows with comparable blowing means.

The same detection apparatus as described (at 16) can in that case be used because the conveyor belt 12 moves just as quickly as the sausages on release from the scissor structure, as described, so that the distance between the sausages in the direction of movement of the belt 12 and therefore their position in said direction are accurately fixed at any instant.

Figure 3:
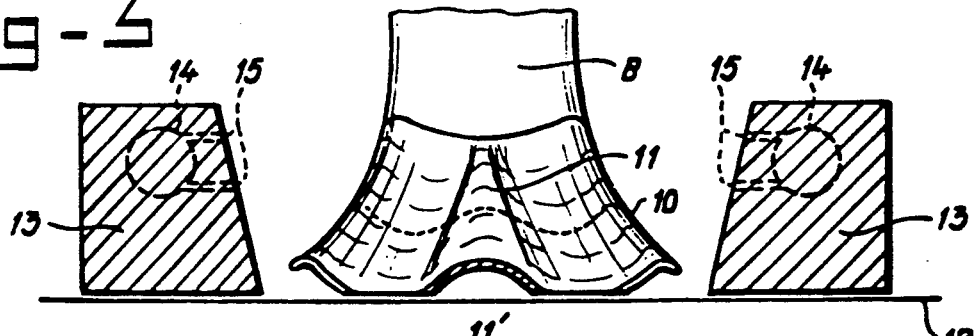
FIG. 3 is a partial section along the line III—III in FIG. 1.
Figure 4:
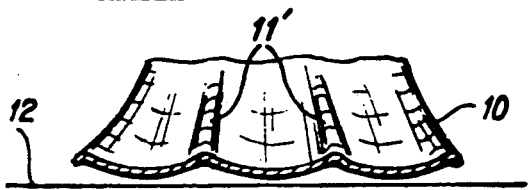
FIG. 4 is one and the same partial section as in FIG. 3 but of another embodiment of the guide surface.

FIG. 4 shows a part of a guide plate 10 in another embodiment in a section approximately at the same position as that of FIG. 3 (III—III in FIG. 1). Said plate 10 has two ridges 11' at a transverse distance from each other, starting somewhat further downstream, lower with respect to the parts of the guide plate inbetween and possibly fanning somewhat outwardly with respect to each other. This embodiment is chosen if the blowing means are actuated in a manner such that they form three rows of sausages from the oncoming string, which can be achieved by constructing their control means in a manner such that as every third sausage passes there is no blowing so that this sausage carries straight on and therefore moves further between the ridges 11'. The ridges 11' preferably then start downstream of the blowing means.

As pointed out, the cutting through of a sausage for the separation thereof with respect to the string is completed at the position of the line IV—IV in FIG. 1. This has the advantage that blowing against the sausage can at least be begun when, although it has been constricted with respect to the string by the scissor blades 5, 6, it is still joined thereto. This gives a reliable distribution, especially of limp sausages which could bend easily in a random manner. As is evident from FIG. 1, a part of the length of the sausage is still just situated in front of the blowing openings 15 after the separation from the string has been completed. Together with the stationary guide plate 10 and the friction, although small, exerted on the sausage thereby, this all results in an ideal operationally reliable distribution of such vulnerable and soft bodies without damage and with blowing already gently and so with little energy loss.

I claim:

1. Apparatus for separating straight sausages from a string by means of a moving endless scissor structure of which the separate scissors convey the string along, constrict it and separate it, having removal means underneath with a moving conveying surface which collects and removes the sausages, characterized in that a stationary sloping guide surface is provided which receives the sausages at the position of separation from the string by the scissor structure and conveys them to the moving transport surface underneath, and in that, downstream of the position of separation of the sausages from the string by the scissor structure, blowing means are provided to the side of the track of the sausages on the guide surface and above the latter in order to blow against the sausages on the guide surface approximately horizontally from the side so that, at the end of the guide surface and on the moving conveying surface, they move further in two or three rows, and in that the scissor construction pushes the sausages on the guide surface by its movement.

2. Apparatus according to claim 1 wherein such blowing means are provided on either side of the track of the sausages on the guide surface and that their control means cause the blowing means to blow alternatingly from one side and from the other side, optionally alternated with periods in which no blowing is carried out.

3. Apparatus according to claim 1 or 2 wherein the means for actuating the scissor structure are so constructed and the stationary guide surface and blowing means are so arranged that the scissor structure separates the sausages from the oncoming string after it has placed the sausages with at least a part of their length on the stationary guide surface in front of the blowing means.

4. Apparatus according to claim 1, wherein the stationary guide surface has at least one elevation extending in the longitudinal direction and sloping smoothly downwards towards both sides transversely to the direction of movement of the feed means in order to separate the sausage rows.

5. Apparatus according to claim 4, wherein the upstream end of said elevation is situated in the zone of the blowing means as seen in the longitudinal direction of movement of the sausages.

6. Apparatus according to claim 4 or 5, in which two such elevations are provided parallel to each other extending in the longitudinal direction of movement of the sausages in the guide surface on either side of the longitudinal movement track of the oncoming sausages, and in that the control means for the blowing means are so constructed that alternatingly they blow to the one side, to the other side and do not blow.

7. Apparatus according to claim 6, wherein the upstream ends of said elevations are situated downstream of the blowing means.

8. Apparatus according to claim 1, wherein the speed of movement of the moving conveying surface is equal to the speed of movement of the scissor structure at the position of the sausage string conveyed along by it.

9. Apparatus according to claim 1, wherein the blowing means are controlled by a sensor which observes the passage of the sausages directly or indirectly.

10. Apparatus according to claim 9, wherein the sensor observes the passage of a mechanical part of a scissor structure which moves concomitantly with the sausage string and which constricts and cuts through the string.

* * * * *